United States Patent
Sumimoto et al.

(10) Patent No.: US 8,800,358 B2
(45) Date of Patent: Aug. 12, 2014

(54) ROAD SURFACE MEMBER FOR TIRE TESTING MACHINE AND MANUFACTURING METHOD OF THE SAME

(75) Inventors: Yu Sumimoto, Takasago (JP); Shogo Sarumaru, Takasago (JP); Munenori Soejima, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 119 days.

(21) Appl. No.: 13/547,858

(22) Filed: Jul. 12, 2012

(65) Prior Publication Data

US 2013/0031968 A1 Feb. 7, 2013

(30) Foreign Application Priority Data

Aug. 3, 2011 (JP) ................................. 2011-170374

(51) Int. Cl.
*G01M 17/02* (2006.01)
(52) U.S. Cl.
CPC .................................. *G01M 17/022* (2013.01)
USPC ............................................................ 73/146

(58) Field of Classification Search
None
See application file for complete search history.

(56) References Cited

U.S. PATENT DOCUMENTS

2006/0169034 A1* 8/2006 Ouyang ........................ 73/146
2007/0256486 A1* 11/2007 Ouyang ........................ 73/146

FOREIGN PATENT DOCUMENTS

| JP | 4-350536 |   | 12/1992 |
| JP | 04350536 A | * | 12/1992 |
| JP | 2001-296212 A |   | 10/2001 |
| JP | 2008-261792 A |   | 10/2008 |

* cited by examiner

*Primary Examiner* — Andre Allen
(74) *Attorney, Agent, or Firm* — Oblon, Spivak, McClelland, Maier & Neustadt, L.L.P.

(57) ABSTRACT

A rotary drum used in a tire testing machine has a road surface base material made of an aluminum alloy and provided with a road surface onto which a tire is pushed. The road surface is coated with a thermally-sprayed steel film having higher hardness than the road surface base material, and polished. With such a configuration, a favorable test result can be obtained.

9 Claims, 1 Drawing Sheet

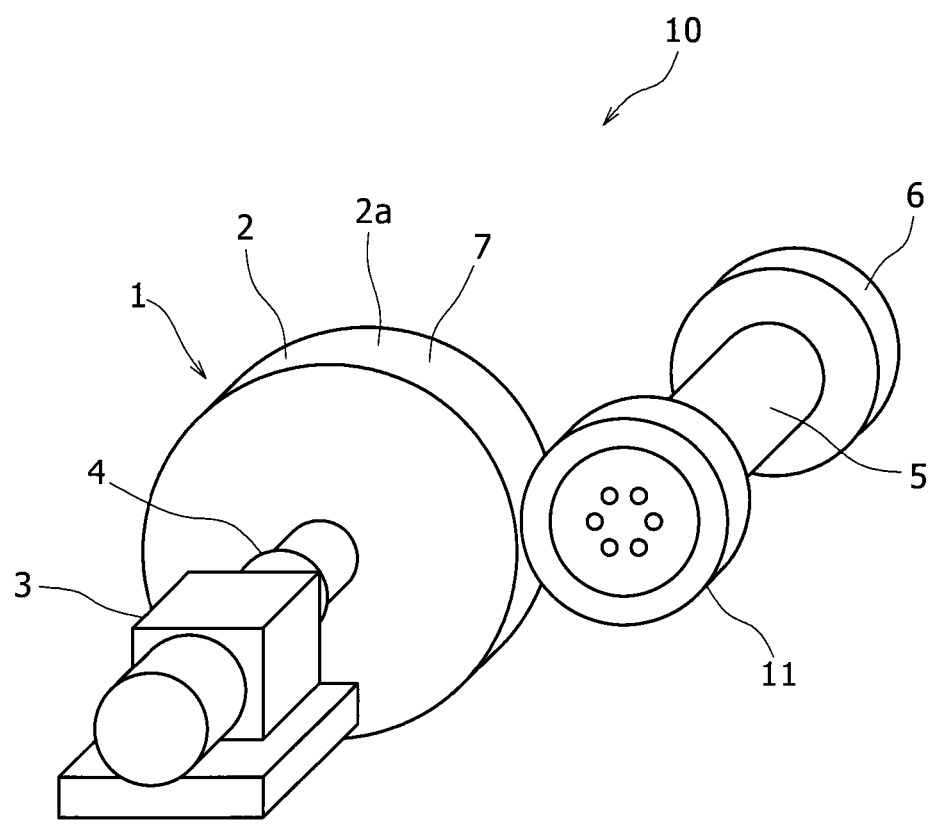

ROAD SURFACE MEMBER FOR TIRE TESTING MACHINE AND MANUFACTURING METHOD OF THE SAME

BACKGROUND OF THE INVENTION

1. Field of the Invention

The present invention relates to a road surface member used in a tire testing machine for performing a performance test of a tire, and a manufacturing method of the same.

2. Description of the Related Art

In a production line of a tire, various performance tests are performed by a tire testing machine in which a rotary drum or a flat plate is pushed onto a rotating tire.

Japanese Unexamined Patent Application Publication No. H4-350536 discloses a tire testing machine in which a road surface is coated with a thermally-sprayed film made of metal carbide such as tungsten carbide, chromium carbide, and titanium carbide so that the road surface of a rotary drum or a flat plate made of iron or aluminum, the road surface serving as a contact surface with a tire has a friction characteristic close to asphalt.

However, with the thermally-sprayed metal carbide film, uniformity of thickness of the thermally-sprayed film and uniformity of surface roughness are not easily controlled, and hence roundness of the rotary drum or flatness of the flat plate is not easily increased.

Concave and convex parts having arithmetic mean roughness of about Ra 16 are created on the road surface to which the thermally-sprayed metal carbide film is thermally sprayed. Therefore, a road surface state is inferior, so that the roundness of the rotary drum or the flatness of the flat plate cannot be precisely measured. In addition, since tremor of the rotary drum and rolling of the road surface are added in a meter provided in a tire shaft, there is sometimes a case where a right value cannot be measured. In particular, in a running test with rotation speed of the tire of not less than 60 km/h from normal speed to high speed region, an influence of the road surface state over a test result is increased.

Thus, it is thought that the road surface is processed. However, since the thermally-sprayed metal carbide film has high hardness, a diamond grindstone is used. Furthermore, since the rotary drum and the flat plate of the tire testing machine are large by themselves, processing is not easily performed and cost is high. Therefore, in an actual situation, the rotary drum and the flat plate of the tire testing machine are used in a state that the thermally-sprayed metal carbide film is thermally sprayed.

In a case where a plurality of tire testing machines is used, a state of the thermally-sprayed metal carbide film is differentiated for each of the tire testing machines, and there is a large individual difference in the roundness and the flatness. Thus, even with tires having the same lot, the test result is varied, and characteristics of the tires cannot be simply compared.

Further, the road surface to which the thermally-sprayed metal carbide film is thermally sprayed is rough and has large concave and convex parts as described above. Thus, depending on test contents such as a high speed test and a control and drive test, there is sometimes a case where rubber of the tire is accumulated in the concave parts, so that a friction coefficient is changed or the roundness is further largely deteriorated. Removal of the rubber accumulated in the concave parts is considerably troublesome.

SUMMARY OF THE INVENTION

An object of the present invention is to provide a road surface member for a tire testing machine capable of obtaining a favorable test result even when a road surface is coated with a thermally-sprayed film, and a manufacturing method of the same.

The present invention is a road surface member for a tire testing machine, the road surface member onto which a tire is pushed in the tire testing machine, including a road surface base material provided with a road surface onto which the tire is pushed, wherein the road surface is coated with a thermally-sprayed steel film having higher hardness than the road surface base material, and a surface of the thermally-sprayed steel film is polished.

According to the above configuration, by coating the road surface of the road surface base material onto which the tire is pushed with the thermally-sprayed steel film having higher hardness than this road surface base material, surface hardness of the road surface can be increased, so that wear caused by the tire can be reduced. By polishing the road surface of the road surface base material coated with the thermally-sprayed steel film, roundness or flatness can be increased, so that an influence of a road surface state over a test result can be decreased and accumulation of rubber in concave parts can be suppressed. Even in a case where a plurality of tire testing machines is used, by coating the road surface of the road surface base material with the thermally-sprayed steel film and then polishing, a state of the thermally-sprayed steel film can be substantially uniformized. Thus, by reducing variation in the roundness or the flatness generated between the tire testing machines, variation in the test result can be suppressed. Thereby, even when the road surface is coated with the thermally-sprayed film, a favorable test result can be obtained.

In the road surface member for the tire testing machine of the present invention with the above configuration, the road surface member may be a rotary drum. Alternatively, the road surface base material may be made of an aluminum alloy. When the road surface member is the rotary drum including the road surface base material made of an aluminum alloy, inertia is decreased in comparison to an iron drum. Therefore, with the rotary drum including the road surface base material made of an aluminum alloy, energy at the time of acceleration or deceleration by a motor can be suppressed in comparison to the iron drum, and speed is easily controlled. In addition, with the rotary drum including the road surface base material made of an aluminum alloy, torsion torque applied to a drum shaft is decreased in comparison to the iron drum. Thus, even when meters such as a torque meter are arranged in the drum shaft, measurement can be performed with favorable precision. The rotary drum including the road surface base material made of an aluminum alloy has favorable thermal conductivity in comparison to the iron drum. Thus, the road surface heated by heat generation of the tire can be quickly cooled after completing a test, so that the test can be shifted to a next tire test with a little time loss.

In a case where the road surface base material is made of an aluminum alloy, the road surface may be coated with a thermally-sprayed nickel-aluminum alloy film, and the thermally-sprayed nickel-aluminum alloy film may be further coated with the thermally-sprayed steel film. According to this configuration, by coating the road surface with the thermally-sprayed nickel-aluminum alloy film having a high adhesive property to the thermally-sprayed steel film before coating the road surface of the road surface base material made of an aluminum alloy with the thermally-sprayed steel film, adhesiveness of the thermally-sprayed steel film can be increased.

In the road surface member for the tire testing machine with the above configuration, Vickers hardness of the thermally-sprayed steel film is preferably Hv 300 to 700.

In the road surface member for the tire testing machine with the above configuration, arithmetic mean roughness Ra of the road surface is preferably not less than 0.4 but less than 16.

The present invention is a manufacturing method of a road surface member for a tire testing machine, the road surface member onto which a tire is pushed in the tire testing machine, including the step of polishing a surface of a thermally-sprayed steel film after coating a road surface of a road surface base material provided with the road surface onto which the tire is pushed with the thermally-sprayed steel film having higher hardness than the road surface base material.

According to the above manufacturing method, by coating the road surface of the road surface base material onto which the tire is pushed with the thermally-sprayed steel film having higher hardness than this road surface base material, the surface hardness of the road surface can be increased, so that the wear caused by the tire can be reduced. By polishing the road surface of the road surface base material coated with the thermally-sprayed steel film, the roundness or the flatness can be increased, so that the influence of the road surface state over the test result can be decreased and the accumulation of rubber in the concave parts can be suppressed. Even in a case where a plurality of tire testing machines is used, by coating the road surface of the road surface base material with the thermally-sprayed steel film and then polishing, the state of the thermally-sprayed steel film can be substantially uniformized. Thus, by reducing the variation in the roundness or the flatness generated between the tire testing machines, the variation in the test result can be suppressed. Thereby, even when the road surface is coated with the thermally-sprayed film, a favorable test result can be obtained.

In the above manufacturing method of the road surface member for the tire testing machine, the road surface may be shot-blasted before coating the road surface with the thermally-sprayed steel film. By this method, by shot-blasting the road surface so as to roughen the road surface before coating the road surface of the road surface base material with the thermally-sprayed steel film, the adhesiveness of the thermally-sprayed steel film can be increased.

In the above manufacturing method of the road surface member for the tire testing machine, the road surface may be coated with a thermally-sprayed nickel-aluminum alloy film before coating the road surface of the road surface base material made of an aluminum alloy with the thermally-sprayed steel film. By this method, by coating the road surface with the thermally-sprayed nickel-aluminum alloy film having a high adhesive property to the thermally-sprayed steel film before coating the road surface of the road surface base material made of an aluminum alloy with the thermally-sprayed steel film, the adhesiveness of the thermally-sprayed steel film can be increased.

According to the road surface member for the tire testing machine of the present invention and the manufacturing method of the same, the wear caused by the tire can be reduced, so that the influence of the road surface state over the test result can be decreased. Even in a case where a plurality of tire testing machines is used, the variation in the test result generated between the tire testing machines can be suppressed. Thereby, a favorable test result can be obtained.

BRIEF DESCRIPTION OF THE DRAWINGS

FIG. 1 is a perspective view showing a tire testing machine.

DESCRIPTION OF THE PREFERRED EMBODIMENTS

Hereinafter, a preferred embodiment of the present invention will be described with reference to the drawings.
(Configuration of Tire Testing Machine)

A road surface member for a tire testing machine according to the present embodiment is a rotary drum 1. The rotary drum 1 is used in a tire testing machine 10. As shown in FIG. 1, the tire testing machine 10 has the rotary drum 1, a drum drive motor 3, a torque meter 4, a spindle 5, and a meter 6.

The rotary drum 1 has a welded structure made of an aluminum alloy, and is formed into a cylindrical shape or a tubular shape with a drum diameter of 2,000 mm and drum width of 450 mm. As shown in the figure, a tire 11 is pushed onto the rotary drum 1. The rotary drum 1 has a road surface base material 2 made of an aluminum alloy and provided with a road surface 2a serving as an outer peripheral surface onto which the tire 11 is pushed. The road surface base material 2 indicates a part of the rotary drum 1 excluding a thermally-sprayed steel film 7 (described later). A material of the road surface base material 2 is not limited to an aluminum alloy but may be other light alloys such as a magnesium alloy, iron, or the like.

The drum drive motor 3 is attached to a support base (not shown) fixed to a floor or the like, so as to rotate the rotary drum 1. The rotary drum 1 and the drum drive motor 3 are moved by a moving means (not shown) so as to be brought close to or away from the spindle 5 from the direction orthogonal to the shaft direction of a rotation shaft of the drum drive motor 3. During a test, as shown in the figure, the rotary drum 1 and the drum drive motor 3 are moved by the moving means so as to be brought close to the spindle 5, and after the road surface 2a of the road surface base material 2 is in contact with an outer peripheral surface of the tire 11, the rotary drum 1 is rotated by the drum drive motor 3.

The torque meter 4 is provided in the rotation shaft of the drum drive motor 3, so as to measure rotation torque of the rotary drum 1. With this torque meter, rolling resistance of the tire 11 can be measured and uniformity of the tire 11 can be evaluated.

The spindle 5 is provided in parallel to the shaft direction of the rotation shaft of the drum drive motor 3, and rotatably supported by a housing (not shown). The spindle 5 supports the tire 11 in such a manner that the outer peripheral surface of the tire 11 faces the road surface 2a of the road surface base material 2. During the test, the tire 11 and the spindle 5 are rotated by rotation of the rotary drum 1 onto which the outer peripheral surface of the tire 11 is pushed.

The meter 6 is provided in the housing (not shown) along the axial direction of the spindle 5, so as to measure a load and moment of the tire 11. With this meter, dynamic balance of the tire 11 can be evaluated.

Since the road surface base material 2 made of an aluminum alloy has low hardness, the road surface 2a is shortly worn away due to the test of the tire 11 of rubber including silica or the like. Thus, it is thought that the road surface 2a is coated with a thermally-sprayed film of metal carbide having high hardness such as tungsten carbide. However, with the thermally-sprayed metal carbide film, uniformity of thickness of the thermally-sprayed film and uniformity of surface roughness are not easily controlled, and hence roundness of the rotary drum 1 is not easily increased. Concave and convex parts having arithmetic mean roughness of about Ra 16 are created on the road surface to which the thermally-sprayed metal carbide film is thermally sprayed. Therefore, a road surface state is inferior, so that the roundness of the rotary drum 1 cannot be precisely measured. In addition, since tremor of the rotary drum 1 and rolling of the road surface are added in the meter 6, there is sometimes a case where a right value cannot be measured. In particular, in a running test with rotation speed of the tire 11 of not less than 60 km/h from normal speed to high speed region, an influence of the road surface state over a test result is increased. Thus, it is thought that the road surface is processed. However, since the thermally-sprayed metal carbide film has high hardness, a diamond grindstone is used. Furthermore, since the rotary drum 1 of the tire testing machine 10 is large by itself, processing is not easily performed and cost is high.

Therefore, in the present embodiment, the road surface 2a of the road surface base material 2 is coated with the thermally-sprayed steel film 7 including SUS316L having higher hardness than an aluminum alloy. Surface hardness of an aluminum ore is Vickers hardness of Hv 80 to 90, and surface hardness of SS400 serving as one example of an iron ore is Hv 115, whereas surface hardness of SUS316L arc-spray is Hv 306. Thereby, surface hardness of the road surface 2a can be increased, and wear caused by the tire 11 can be reduced, so that the life of the road surface base material 2 can be extended. It should be noted that although SUS316L having a favorable mechanical processing property is selected as the thermally-sprayed steel film 7 in the present embodiment, the thermally-sprayed steel film 7 is not limited to this but may be SUS308, SUS410, or the like. The film is formed not necessarily by thermal spraying but by vapor deposition or plating.

Further, the road surface 2a of the road surface base material 2 is polished after coated with the thermally-sprayed steel film 7. Surface hardness of tungsten carbide is Hv 900, whereas surface hardness of SUS316L arc-spray is Hv 306. Thus, by polishing with a general grindstone, the road surface 2a of the road surface base material 2 can be finished to have arbitrary surface roughness. It should be noted that since arithmetic mean roughness of a road surface to which a thermally-sprayed metal carbide film is thermally sprayed is about Ra 16, the road surface 2a of the road surface base material 2 is preferably polished so as to have arithmetic mean roughness of Ra 0.4 to less than 16. Thereby, the roundness of the rotary drum 1 can be increased, so that the influence of the road surface state over the test result can be decreased and accumulation of rubber in the concave parts can be suppressed.

Even in a case where a plurality of tire testing machines 10 is used, by coating the road surface 2a of the road surface base material 2 with the thermally-sprayed steel film 7 and then polishing, a state of the thermally-sprayed steel film 7 can be substantially uniformized. Thus, by reducing variation in the roundness generated between the tire testing machines 10, variation in the test result can be suppressed.

In consideration with wear resistance, the thermally-sprayed steel film 7 desirably has Vickers hardness of not less than Hv 200, and more desirably not less than Hv 300 which is sufficiently large hardness in comparison to an aluminum alloy (light alloy) of the material of the road surface base material 2. It should be noted that the thermally-sprayed steel film 7 is desirably a material up to Hv 700 which is capable of being ground with a general grindstone and easily polished. Therefore, the thermally-sprayed steel film 7 desirably has Vickers hardness of Hv 300 to 700 in consideration with the wear resistance and workability.

In the tire testing machine 10, speed is not easily controlled in the test from the normal speed to the high speed region. In particular, speed control of an iron rotary drum (iron drum) or the like having high inertia by a low-inertia motor is highly difficult due to a difference of inertia, and large torsion torque is applied to a rotation shaft of the motor. Therefore, measurement values of the torque meter 4 and the meter 6 are highly unstabilized and varied, and in addition, the torque meter 4 and the meter 6 are broken at the worst.

Thus, in the present embodiment, an aluminum alloy is used as the material of the road surface base material 2. The rotary drum 1 having the road surface base material 2 made of an aluminum alloy has low inertia in comparison to the iron drum. Therefore, with the rotary drum 1, energy at the time of acceleration or deceleration by the drum drive motor 3 can be suppressed in comparison to the iron drum, and the speed is easily controlled. In addition, with the rotary drum 1, torsion torque applied to the rotation shaft of the drum drive motor 3 is decreased in comparison to the iron drum. Thus, even when the meters such as the torque meter 4 are arranged in the rotation shaft of the drum drive motor 3, measurement can be performed with favorable precision. The rotary drum 1 has favorable thermal conductivity in comparison to the iron drum. Thus, the road surface heated by heat generation of the tire 11 can be quickly cooled after completing the test, so that the test can be shifted to a next tire test with a little time loss.

(Manufacturing Method of Rotary Drum)

Next, a manufacturing method of the rotary drum 1 will be described. Firstly, the road surface base material 2 is formed by combining members. The road surface 2a of the road surface base material 2 is shot-blasted. Specifically, by bringing a granular body called as a blasting material into contact with the road surface 2a of the road surface base material 2, the road surface 2a of the road surface base material 2 is roughened. Thereby, adhesiveness of the thermally-sprayed steel film 7 to be thermally sprayed to the road surface 2a later can be increased. After that, the road surface 2a of the road surface base material 2 is coated with a thermally-sprayed nickel-aluminum alloy film having a high adhesive property to the thermally-sprayed steel film 7. Thereby, the adhesiveness of the thermally-sprayed steel film 7 to be thermally sprayed to the road surface 2a later can be further increased. After that, the road surface 2a of the road surface base material 2 is coated with the thermally-sprayed steel film 7 including SUS316L. It should be noted that shot-blasting and coating with the thermally-sprayed nickel-aluminum alloy film may be performed in the reverse order.

Upon coating the road surface 2a of the road surface base material 2 with the thermally-sprayed steel film 7, melted metal is jetted to the road surface 2a of the road surface base material 2. Thus, the concave and convex parts are created on the road surface 2a of the road surface base material 2 already coated with the thermally-sprayed steel film 7, and the arithmetic mean roughness thereof is about Ra 16. Therefore, after the road surface 2a of the road surface base material 2 is coated with the thermally-sprayed steel film 7, the road surface 2a of the road surface base material 2 is polished. Specifically, by polishing the thermally-sprayed steel film 7 by a mechanical grinder, the concave and convex parts are removed from the road surface 2a of the road surface base material 2. Thereby, the road surface 2a of the road surface base material 2 is finished to have proper surface roughness.

In the present embodiment, when the surface roughness of the road surface 2a of the road surface base material 2 was examined after polishing, the surface roughness was about Ra 0.6. At the time of thermally spraying melted metal, thickness of the thermally-sprayed steel film 7 becomes uneven, and there is sometimes a case where the roundness of the rotary drum 1 itself is deteriorated. However, in the present embodiment, a difference between a maximum outer diameter and a minimum outer diameter after polishing was 0.01 mm. Therefore, at the time of measuring the load and the moment of the tire 11 by the meter 6, an influence of the tremor of the rotary drum 1 over a measurement result was not problematic.

(Effects)

As described above, with the rotary drum 1 according to the present embodiment, by coating the road surface 2a of the road surface base material 2 onto which the tire 11 is pushed with the thermally-sprayed steel film 7 having higher hardness than this road surface base material 2, the surface hardness of the road surface 2a can be increased, so that the wear caused by the tire 11 can be reduced. By polishing the road surface 2a of the road surface base material 2 coated with the thermally-sprayed steel film 7, the roundness can be increased, so that the influence of the road surface state over the test result can be decreased and the accumulation of rubber in the concave parts can be suppressed. Even in a case where the plurality of tire testing machines 10 is used, by coating the road surface 2a of the road surface base material 2 with the thermally-sprayed steel film 7 and then polishing, the state of the thermally-sprayed steel film 7 can be substantially uniformized. Thus, by reducing the variation in the roundness generated between the tire testing machines 10, the variation in the test result can be suppressed. Thereby, even when the road surface is coated with the thermally-sprayed film, a favorable test result can be obtained.

When the road surface member is the rotary drum 1 including the road surface base material 2 made of a light alloy, inertia is decreased in comparison to the iron drum. Therefore, with the rotary drum 1 including the road surface base material 2 made of a light alloy, the energy at the time of the acceleration or the deceleration by the drum drive motor 3 can be suppressed in comparison to the iron drum, and the speed is easily controlled. In addition, with the rotary drum 1 including the road surface base material 2 made of a light alloy, the torsion torque applied to the rotation shaft of the drum drive motor 3 is decreased in comparison to the iron drum. Thus, even when the meters such as the torque meter 4 are arranged in the rotation shaft of the drum drive motor 3, the measurement can be performed with favorable precision. The rotary drum 1 including the road surface base material 2 made of a light alloy has favorable thermal conductivity in comparison to the iron drum. Thus, the road surface heated by the heat generation of the tire 11 can be quickly cooled after completing the test, so that the test can be shifted to a next tire test with a little time loss.

By shot-blasting the road surface 2a so as to roughen the road surface 2a before coating the road surface 2a of the road surface base material 2 with the thermally-sprayed steel film 7, the adhesiveness of the thermally-sprayed steel film 7 can be increased.

By coating the road surface 2a with the thermally-sprayed nickel-aluminum alloy film having a high adhesive property to the thermally-sprayed steel film 7 before coating the road surface 2a of the road surface base material 2 made of an aluminum alloy with the thermally-sprayed steel film 7, the adhesiveness of the thermally-sprayed steel film 7 can be increased.

(Modified Example of the Present Embodiment)

Although the embodiment of the present invention is described above, the embodiment does not particularly limit the present invention but only shows a specific example. Specific configurations and the like can be appropriately designed and changed. The operations and the effects described in the embodiment of the invention are only a list of the most preferable operations and effects generated out of the present invention. The operations and effects according to the present invention are not limited to description of the embodiment of the present invention.

For example, although the rotary drum 1 is described as the road surface member, the road surface member may be a flat plate. Even in this case, by coating a road surface serving as a surface of a road surface base material of the flat plate with the thermally-sprayed steel film 7 having higher hardness than the road surface base material, the wear caused by the tire 11 can be reduced. By polishing the road surface coated with the thermally-sprayed steel film 7, flatness of the flat plate can be increased.

What is claimed is:

1. A road surface member for a tire testing machine, the road surface member onto which a tire is pushed in the tire testing machine, comprising:
   a road surface base material provided with a road surface onto which the tire is pushed, wherein
   said road surface is coated with a thermally-sprayed steel film having higher hardness than said road surface base material, and
   a surface of the thermally-sprayed steel film is polished,
   wherein an arithmetic mean roughness Ra of said road surface is not less than 0.4 but less than 16.

2. The road surface member for the tire testing machine according to claim 1, wherein
   said road surface member is a rotary drum.

3. The road surface member for the tire testing machine according to claim 1, wherein said road surface base material is made of an aluminum alloy.

4. The road surface member for the tire testing machine according to claim 3, wherein
   said road surface is coated with a thermally-sprayed nickel-aluminum alloy film, and
   the thermally-sprayed nickel-aluminum alloy film is further coated with the thermally-sprayed steel film.

5. The road surface member for the tire testing machine according to claim 1, wherein a Vickers hardness of the thermally-sprayed steel film is Hv 300 to 700.

6. A manufacturing method of a road surface member onto which a tire is to be pushed in a tire testing machine, comprising the steps of:
   coating a road surface of a road surface base material with a thermally-sprayed steel film having higher hardness than the road surface base material; and
   polishing a surface of a thermally-sprayed steel film so as to have arithmetic mean roughness of Ra 0.4 to less than 16.

7. The manufacturing method of the road surface member for the tire testing machine according to claim 6, wherein the road surface is shot-blasted before coating the road surface with the thermally-sprayed steel film.

8. The manufacturing method of the road surface member for the tire testing machine according to claim 6, wherein the road surface is coated with a thermally-sprayed nickel-aluminum alloy film before coating the road surface of the road surface base material made of an aluminum alloy with the thermally-sprayed steel film.

9. The road surface member for the tire testing machine according to claim 1, wherein the steel is stainless steel.

* * * * *